(12) United States Patent
Chuang

(10) Patent No.: US 8,342,479 B2
(45) Date of Patent: Jan. 1, 2013

(54) SOLENOID CONTROLLED VALVE FOR FLUID MEDIA

(75) Inventor: Shih Fen Chuang, Changhua (TW)

(73) Assignee: Shih Shih Technology Co., Ltd., Huatan Changhua (TW)

( * ) Notice: Subject to any disclaimer, the term of this patent is extended or adjusted under 35 U.S.C. 154(b) by 240 days.

(21) Appl. No.: 12/930,137

(22) Filed: Dec. 29, 2010

(65) Prior Publication Data

US 2012/0168655 A1   Jul. 5, 2012

(51) Int. Cl.
*F16K 31/06* (2006.01)
(52) U.S. Cl. .................................. 251/129.15; 251/366
(58) Field of Classification Search ............. 251/129.15, 251/129.01, 366–367; 335/266, 306
See application file for complete search history.

(56) References Cited

U.S. PATENT DOCUMENTS

| | | | |
|---|---|---|---|
| 4,313,590 A | 2/1982 | Nishimiya | |
| 4,651,041 A * | 3/1987 | Shiraki et al. ............ | 251/129.02 |
| 4,791,958 A | 12/1988 | Brundage | |
| 4,901,974 A * | 2/1990 | Cook et al. ............... | 251/129.15 |
| 4,981,280 A | 1/1991 | Brandenberg | |
| 5,237,980 A * | 8/1993 | Gillier ....................... | 251/129.15 |
| 6,003,839 A * | 12/1999 | Kobayashi ............... | 251/129.15 |
| 6,152,422 A * | 11/2000 | Staib et al. ............... | 251/129.15 |
| 6,536,634 B2 | 3/2003 | Berndorfer et al. | |
| 7,204,473 B2 * | 4/2007 | Yoshimura et al. ...... | 251/129.15 |
| 7,367,543 B2 | 5/2008 | Sisk | |
| 7,383,854 B2 | 6/2008 | Berger et al. | |

* cited by examiner

*Primary Examiner* — John Bastianelli
(74) *Attorney, Agent, or Firm* — Charles E. Baxley

(57) ABSTRACT

A solenoid controlled valve includes a housing engaged into a receptacle and having a tubular member and having an outer peripheral space for receiving a coil, and having a peripheral compartment for receiving two magnetic conductive members, a solenoid controlled device includes two prongs connected to the coil, the housing includes an inlet mouth, and an outlet mouth communicative with the tubular member, and includes a valve seat formed between the outer end portion of the tubular member and the outlet mouth, and one or more reinforcing ribs for reinforcing the tubular member to resist a greater pressure, and the solenoid controlled device includes a plunger for engaging with the valve seat of the housing.

12 Claims, 3 Drawing Sheets

SOLENOID CONTROLLED VALVE FOR FLUID MEDIA

BACKGROUND OF THE INVENTION

1. Field of the Invention

The present invention relates to a solenoid controlled valve for a fluid flow, and more particularly to a solenoid controlled valve including an improved structure for resisting a greater flowing pressure and for suitably blocking or sealing or opening the valve seat of the solenoid controlled valve.

2. Description of the Prior Art

Typical solenoid controlled valves comprise an outer receptacle having an inlet port and an outlet port, a solenoid control mechanism disposed in the outer receptacle for controlling a fluid flow or medium to flow from the inlet port toward and out of the outlet port.

For example, U.S. Pat. No. 4,313,590 to Nishimiya, U.S. Pat. No. 4,791,958 to Brundage, U.S. Pat. No. 4,981,280 to Brandenberg, U.S. Pat. No. 6,536,634 to Berndorfer et al., U.S. Pat. No. 7,367,543 to Sisk, and U.S. Pat. No. 7,383,854 to Berger et al. disclose several of the typical solenoid controlled or operated valves and each also comprising an outer receptacle having an inlet port and one or more outlet ports, and a solenoid control mechanism disposed in the outer receptacle for controlling a fluid flow or medium to flow from the inlet port toward and out of the outlet ports.

However, the typical solenoid controlled or operated valves comprise a complicated structure that may not be easily manufactured and that may include a greatly increased manufacturing cost. In addition, the typical solenoid controlled or operated valves normally may not resist a greater flowing pressure, and the valve seat of the solenoid controlled valve may not be suitably or effectively blocked or sealed or controlled.

The present invention has arisen to mitigate and/or obviate the afore-described disadvantages of the conventional solenoid controlled valves.

SUMMARY OF THE INVENTION

The primary objective of the present invention is to provide a solenoid controlled valve including an improved structure for resisting a greater flowing pressure and for suitably blocking or sealing or opening or controlling the valve seat of the solenoid controlled valve.

In accordance with one aspect of the invention, there is provided a solenoid controlled valve comprising a receptacle including a chamber formed therein, and including a first end and a second end, a housing engaged into the chamber of the receptacle and including a tubular member having a bore formed in the tubular member, and including an outer peripheral space formed in an outer peripheral portion of the tubular member and defined between spaced first and second panels, and including a peripheral compartment formed in the outer peripheral portion of the tubular member and defined between a plate and the first panel, the tubular member including an outer end portion extended out of the second end of the receptacle, a solenoid controlled device including a coil engaged in the outer peripheral space of the housing, and including two prongs attached to the housing and extended out of the housing and electrically connected to the coil, two magnetic conductive members engaged in the peripheral compartment of the housing, the housing including an inlet mouth extended from the outer end portion of the tubular member and communicative with the bore of the tubular member for receiving a fluid, and including an outlet mouth extended from the outer end portion of the tubular member and having an orifice formed in the outlet mouth and communicative with the bore of the tubular member for allowing the fluid to selectively flow out through the orifice of the outlet mouth, the housing including a valve seat formed within and defined between the outer end portion of the tubular member and the outlet mouth, and including at least one reinforcing rib provided between the tubular member and the plate for reinforcing the tubular member and for resisting a greater flowing pressure, and the solenoid controlled device including a stator attached to the housing, a plunger slidably engaged in the bore of the tubular member and having an end portion for selectively engaging with the valve seat of the housing and for selectively blocking; and opening and controlling the valve seat of the housing, a spring biasing member engaged in the bore of the tubular member and engaged with the plunger for biasing the end portion of the plunger to selectively engage with the valve seat of the housing and for suitably blocking or sealing or opening or controlling the valve seat of the solenoid controlled valve.

The valve seat of the housing is a rounded valve seat, or is frustum-shaped. The stator is attached to the second panel of the housing and includes an extension extended outwardly therefrom and engaged into the bore of the tubular member. The stator includes a sealing ring engaged between the extension of the stator and the tubular member for making a tight seal between the extension of the stator and the tubular member.

The end portion of the plunger is a resilient end portion. The housing includes a first cap for selectively engaging with the inlet mouth and for selectively blocking the inlet mouth of the housing, and a second cap for selectively engaging with the outlet mouth and for selectively blocking the outlet mouth of the housing.

The inlet mouth of the housing is perpendicular to the tubular member. The outlet mouth of the housing is parallel to the tubular member. The housing includes a cover engaged into the chamber of the receptacle and attached to the first end of the receptacle, and the prongs are extended out through the cover.

The housing includes a rounded coupling portion formed between the outer end portion of the tubular member and the outlet mouth. The reinforcing rib is provided between the tubular member and the plate and the inlet mouth of the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
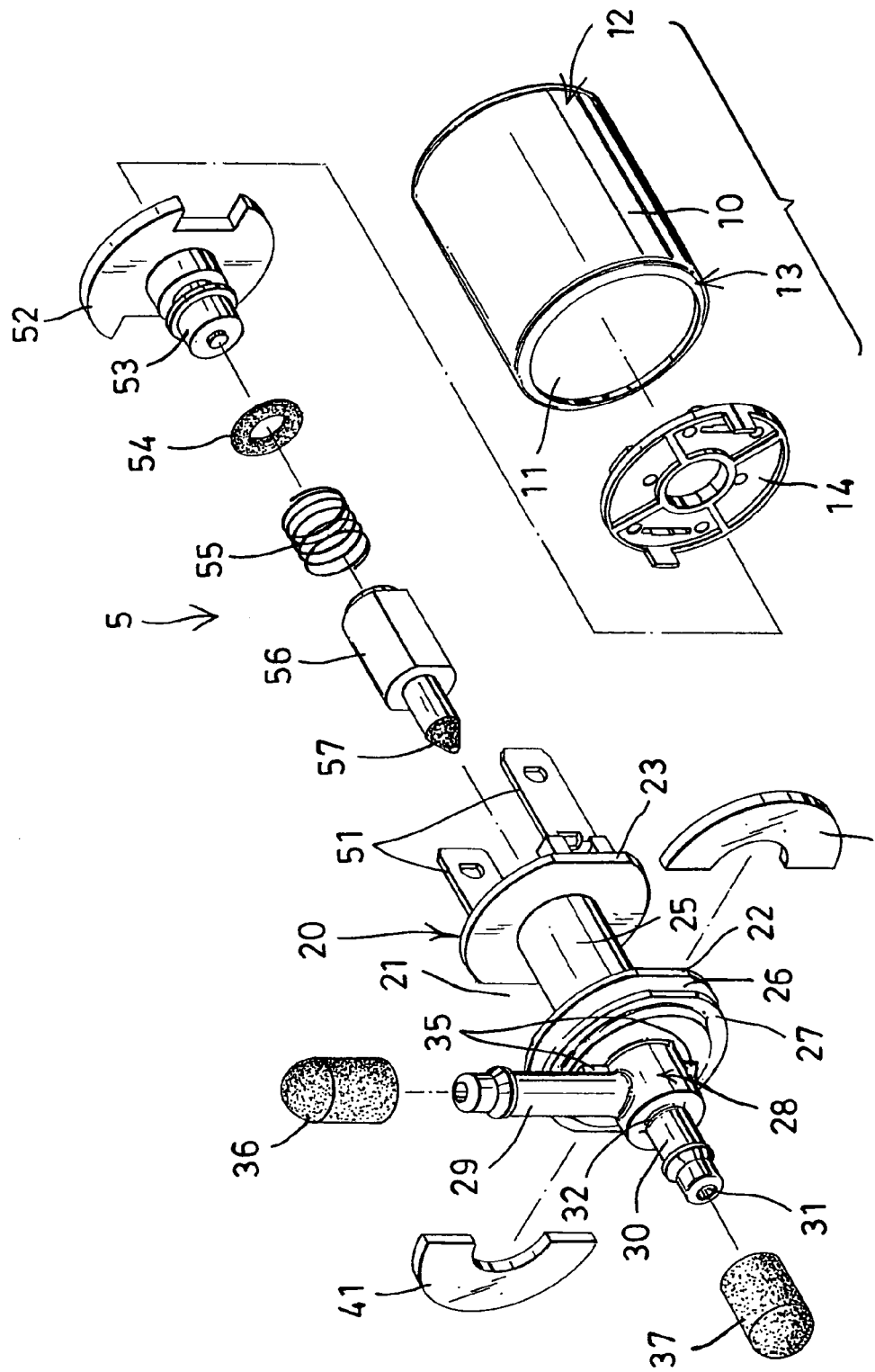
FIG. 1 is an exploded view of a solenoid controlled valve in accordance with the present invention.
Figure 2:
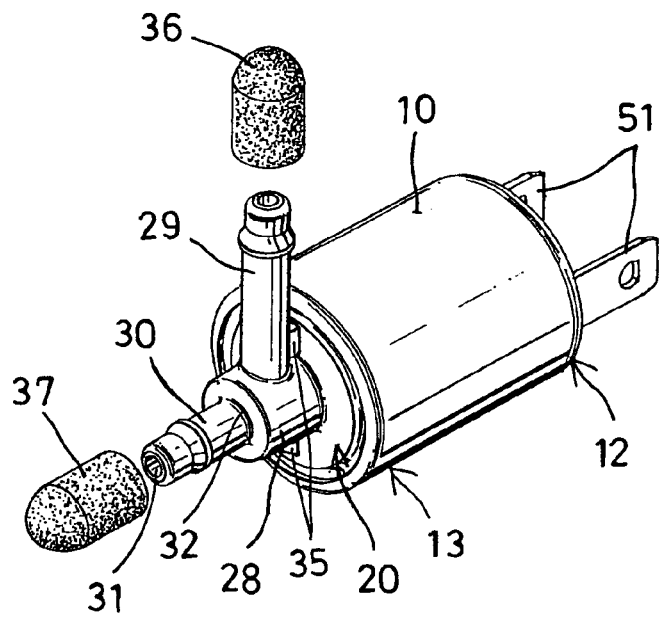
FIG. 2 is a partial exploded view of the solenoid controlled valve.
Figure 3:
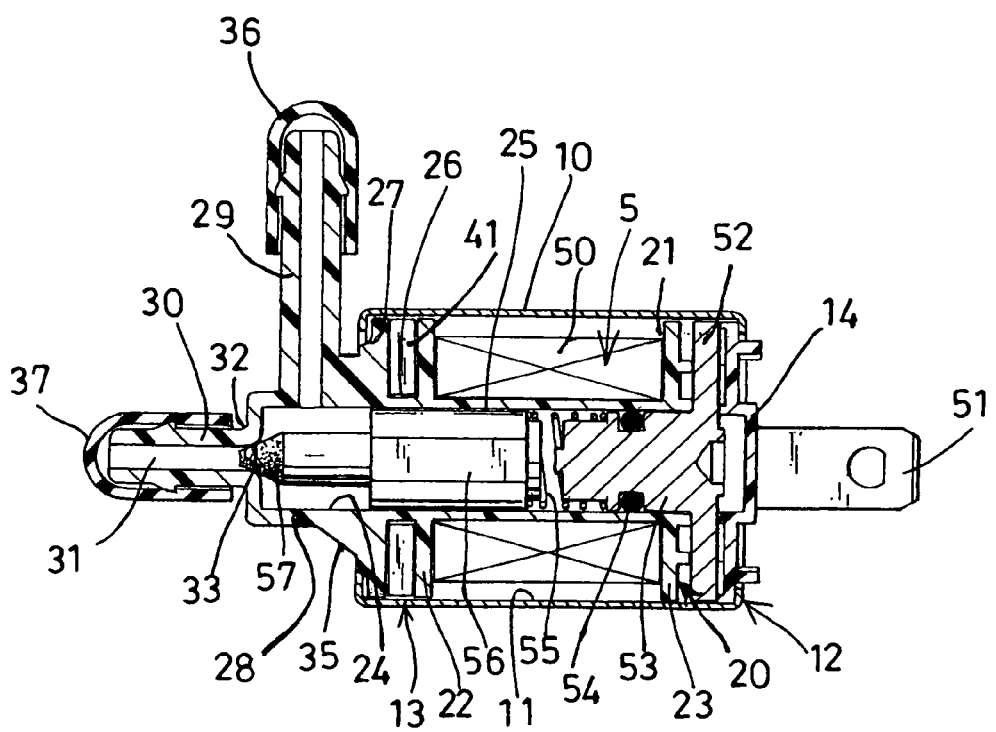
FIG. 3 is a cross sectional view of the solenoid controlled valve.

Referring to the drawings, and initially to FIGS. 1-3, a solenoid controlled valve in accordance with the present invention comprises an outer receptacle 10 including a chamber 11 formed therein and having two open ends 12, 13, and a cover 14 disposed or attached or mounted or secured or engaged into the chamber 11 of the outer receptacle 10 and attached or mounted or secured or anchored or retained in one of the ends 12 of the outer receptacle 10 for partially blocking the one end 12 of the outer receptacle 10. A housing 20 is also disposed or attached or mounted or secured or engaged into the chamber 11 of the outer receptacle 10 and includes an outer peripheral space 21 formed in the outer peripheral portion thereof and formed or defined between two spaced first and second panels 22, 23 for receiving or engaging with a coil 50 of a solenoid controlled device 5 therein (FIG. 3).

The housing 20 includes a bore 24 formed therein and defined by a tubular member 25, and includes an annular or peripheral compartment 26 formed in the outer peripheral portion of the tubular member 25 and formed or defined between one of the panels or the first panel 22 and a partition plate 27 for receiving or engaging with one or more (such as two) magnetic conductive members 41, 42, the outer peripheral space 21 is also formed in the outer peripheral portion of the tubular member 25, the tubular member 25 includes an outer end portion 28 extended out of the outer receptacle 10, and the housing 20 further includes an inlet mouth 29 extended from the outer end portion 28 of the tubular member 25 and perpendicular to the tubular member 25 and communicative with the bore 24 of the tubular member 25 for coupling to a water or fluid or air reservoir (not shown) and for allowing the air or water or other fluid media to selectively flow into the bore 24 of the tubular member 25.

The housing 20 further includes an outlet mouth 30 also extended from the outer end portion 28 of the tubular member 25 and parallel to the tubular member 25 and having an orifice 31 formed therein and communicative with the bore 24 of the tubular member 25 for allowing the air or water or other fluid media to selectively flow out through the orifice 31 of the outlet mouth 30. The housing 20 may include a rounded coupling portion 32 formed or defined between the outer end portion 28 of the tubular member 25 and the outlet mouth 30, and may include a rounded valve seat 33 formed within and defined between the outer end portion 28 of the tubular member 25 and the outlet mouth 30, and may include one or more reinforcing ribs 35 provided and formed or defined between the tubular member 25 and the plate 27 and/or the inlet mouth 29 for reinforcing purposes and for allowing the tubular member 25 to resist an increased greater flowing pressure.

The housing 20 may further include one or more (such as two) caps 36, 37 for selectively engaging with the inlet mouth 29 and/or the outlet mouth 30 and for selectively blocking or sealing or opening the inlet mouth 29 and/or the outlet mouth 30. The solenoid controlled device 5 includes one or more (such as two) prongs 51 attached or mounted or secured or coupled to the housing 20, such as attached or mounted or secured to the second panel 23 of the housing 20 and extended out through the cover 14 and extended out of the housing 20, and electrically connected or coupled to the coil 50 for plugging to the control device or electric power source (not shown) and for selectively energizing the coil 50.

The solenoid controlled device 5 further includes a stator 52 attached or mounted or secured to the housing 20, such as attached or mounted or secured to the second panel 23 of the housing 20 and disposed between the prongs 51, and the stator 52 includes a shank or extension 53 extended outwardly therefrom and engaged into the bore 24 of the tubular member 25, and includes a retaining or sealing ring 54 disposed and engaged between the extension 53 of the stator 52 and the tubular member 25 for making an air tight or water tight seal between the extension 53 of the stator 52 and the tubular member 25, and includes a spring biasing member 55 also disposed and engaged in the bore 24 of the tubular member 25 and contacted or engaged with the extension 53 of the stator 52.

Figure 4:
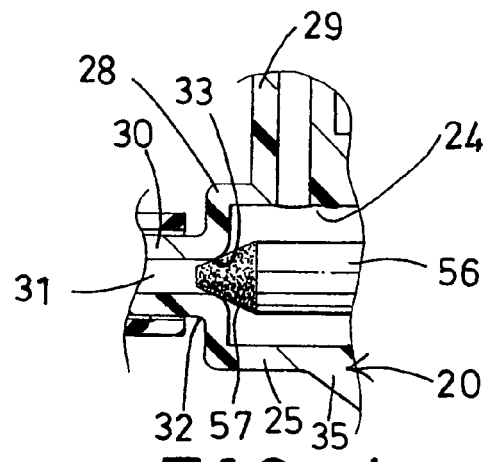
FIG. 4 is an enlarged partial cross sectional view of the solenoid controlled valve.
Figure 5:
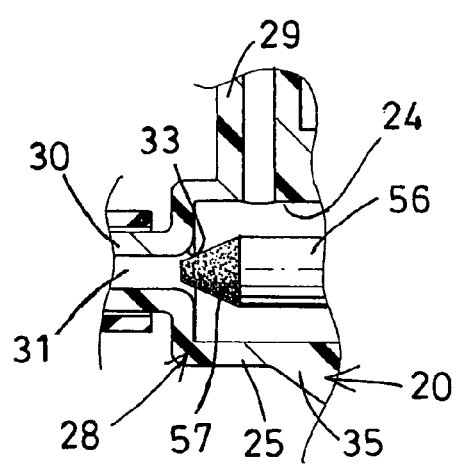
FIG. 5 is another enlarged partial cross sectional view similar to FIG. 4, illustrating the operation of the solenoid controlled valve.

The solenoid controlled device 5 further includes a slidable core or plunger 56 slidably received or engaged in the bore 24 of the tubular member 25 and engaged with the spring biasing member 55, and the core or plunger 56 is made of corrosion resistive materials, such as MG2, and includes one soft or resilient end portion 57 for selectively engaging with the valve seat 33 of the housing 20 and for selectively blocking or sealing or opening or controlling the valve seat 33 of the housing 20, the spring biasing member 55 may bias and force the soft or resilient end portion 57 of the core or plunger 56 to engage with the valve seat 33 of the housing 20 (FIG. 4), and the coil 50 may be selectively energized to move or force the plunger 56 onto the spring biasing member 55 and to disengage the soft or resilient end portion 57 of the plunger 56 from the valve seat 33 of the housing 20, and thus to allow the air or water or other fluid media to selectively flow out through the orifice 31 of the outlet mouth 30 (FIG. 5).

In operation, as shown in FIG. 4, the spring biasing member 55 may bias and force the soft or resilient end portion 57 of the core or plunger 56 to engage with the valve seat 33 of the housing 20 and to block the orifice 31 of the outlet mouth 30 and to prevent the air or water or other fluid media from flowing out through the orifice 31 of the outlet mouth 30. On the contrary, as shown in FIG. 5, when the coil 50 is energized, the plunger 56 may be actuated or operated by the magnetic conductive members 41, 42 and/or the coil 50 and/or the stator 52, and may be moved or forced onto the spring biasing member 55 and the soft or resilient end portion 57 of the plunger 56 may be disengaged from the valve seat 33 of the housing 20, and thus to allow the air or water or other fluid media to selectively flow out through the orifice 31 of the outlet mouth 30 when required.

Figure 6:
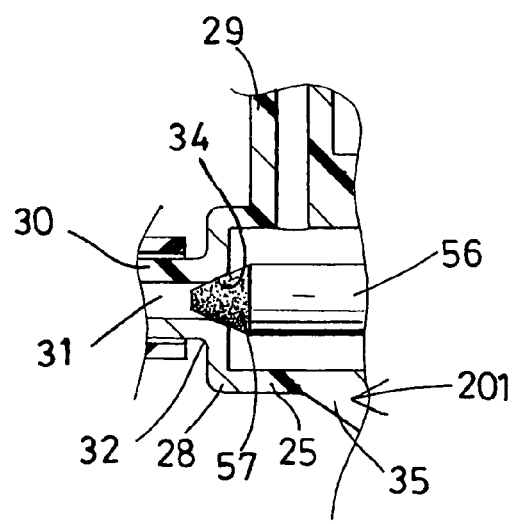
FIG. 6 is a further enlarged partial cross sectional view similar to FIGS. 4 and 5, illustrating the other arrangement of the solenoid controlled valve.

It is to be noted that the soft or resilient end portion 57 of the plunger 56 may be suitably or resiliently engaged with the rounded valve seat 33 of the housing 20 and may have an increased contact area with the rounded valve seat 33 of the housing 20 for suitably and selectively blocking or sealing or opening or controlling the valve seat 33 of the housing 20, and the reinforcing ribs 35 may be provided and used to reinforce the tubular member 25 and the plate 27 and/or the inlet mouth 29 and for suitably increasing the working life of the solenoid controlled valve. Alternatively, as shown in FIG. 6, the housing 20 may include a tilted or inclined or frustum-shaped valve seat 34 formed within and defined between the outer end portion 28 of the tubular member 25 and the outlet mouth 30 for suitably and selectively blocking or sealing or opening or controlling the valve seat 34 of the housing 20.

Accordingly, the solenoid controlled valve in accordance with the present invention includes an improved structure for resisting a greater flowing pressure and for suitably blocking or sealing or opening or controlling the valve seat of the solenoid controlled valve.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A solenoid controlled valve comprising:
   a receptacle including a chamber formed therein, and including a first end and a second end,
   a housing engaged into said chamber of said receptacle and including a tubular member having a bore formed in said tubular member, and including an outer peripheral space formed in an outer peripheral portion of said tubular member and defined between spaced first and second panels, and including a peripheral compartment formed in said outer peripheral portion of said tubular member and defined between a plate and said first panel, said tubular member including an outer end portion extended out of said second end of said receptacle,
   a solenoid controlled device including a coil engaged in said outer peripheral space of said housing, and including two prongs attached to said housing and extended out of said housing and electrically connected to said coil,
   two magnetic conductive members engaged in said peripheral compartment of said housing,
   said housing including an inlet mouth extended from said outer end portion of said tubular member and communicative with said bore of said tubular member for receiving a fluid, and including an outlet mouth extended from said outer end portion of said tubular member and having an orifice formed in said outlet mouth and communicative with said bore of said tubular member for allowing the fluid to selectively flow out through said orifice of said outlet mouth,
   said housing including a valve seat formed within and defined between said outer end portion of said tubular member and said outlet mouth, and including at least one reinforcing rib provided between said tubular member and said plate for reinforcing said tubular member, and
   said solenoid controlled device including a stator attached to said housing, a plunger slidably engaged in said bore of said tubular member and having an end portion for selectively engaging with said valve seat of said housing and for selectively blocking; and opening and controlling said valve seat of said housing, a spring biasing member engaged in said bore of said tubular member and engaged with said plunger for biasing said end portion of said plunger to selectively engage with said valve seat of said housing.

2. The solenoid controlled valve as claimed in claim 1, wherein said valve seat of said housing is a rounded valve seat.

3. The solenoid controlled valve as claimed in claim 1, wherein said valve seat of said housing is frustum-shaped.

4. The solenoid controlled valve as claimed in claim 1, wherein said stator is attached to said second panel of said housing and includes an extension extended outwardly therefrom and engaged into said bore of said tubular member.

5. The solenoid controlled valve as claimed in claim 4, wherein said stator includes a sealing ring engaged between said extension of said stator and said tubular member for making a tight seal between said extension of said stator and said tubular member.

6. The solenoid controlled valve as claimed in claim 1, wherein said end portion of said plunger is a resilient end portion.

7. The solenoid controlled valve as claimed in claim 1, wherein said housing includes a first cap for selectively engaging with said inlet mouth and for selectively blocking said inlet mouth of said housing, and a second cap for selectively engaging with said outlet mouth and for selectively blocking said outlet mouth of said housing.

8. The solenoid controlled valve as claimed in claim 1, wherein said inlet mouth of said housing is perpendicular to said tubular member.

9. The solenoid controlled valve as claimed in claim 1, wherein said outlet mouth of said housing is parallel to said tubular member.

10. The solenoid controlled valve as claimed in claim 1, wherein said housing includes a cover engaged into said chamber of said receptacle and attached to said first end of said receptacle, and said prongs are extended out through said cover.

11. The solenoid controlled valve as claimed in claim 1, wherein said housing includes a rounded coupling portion formed between said outer end portion of said tubular member and said outlet mouth.

12. The solenoid controlled valve as claimed in claim 1, wherein said at least one reinforcing rib is provided between said tubular member and said plate and said inlet mouth of said housing.

* * * * *